US011337352B2

(12) United States Patent
Thorn

(10) Patent No.: US 11,337,352 B2
(45) Date of Patent: May 24, 2022

(54) DIGGING FORK

(71) Applicant: OAKTHRIFT CORPORATION LTD., Hertfordshire (GB)

(72) Inventor: James John Thorn, Rochford (GB)

(73) Assignee: OAKTHRIFT CORPORATION LTD., Hertfordshire (GB)

( * ) Notice: Subject to any disclaimer, the term of this patent is extended or adjusted under 35 U.S.C. 154(b) by 0 days.

(21) Appl. No.: 16/874,970

(22) Filed: May 15, 2020

(65) Prior Publication Data

US 2020/0359539 A1 Nov. 19, 2020

(30) Foreign Application Priority Data

May 15, 2019 (GB) ........................................ 1906833

(51) Int. Cl.
*A01B 1/04* (2006.01)
*A01D 9/02* (2006.01)
*A01B 1/14* (2006.01)

(52) U.S. Cl.
CPC .................. *A01B 1/04* (2013.01); *A01B 1/14* (2013.01); *A01D 9/02* (2013.01)

(58) Field of Classification Search
CPC .... A01B 1/04; A01B 1/14; A01B 1/16; A01D 9/00; A01D 9/02; A01D 11/02; A01D 11/04

USPC ........................................... 294/55.5; 172/378
See application file for complete search history.

(56) References Cited

U.S. PATENT DOCUMENTS

| | | | | | |
|---|---|---|---|---|---|
| 5,360,071 | A | * | 11/1994 | Bergendorf | A01B 1/04 172/371 |
| 5,477,667 | A | * | 12/1995 | Bryant | A01B 1/08 172/375 |
| 5,706,900 | A | * | 1/1998 | Liao | A01B 1/14 16/402 |
| D434,288 | S | * | 11/2000 | Todd | D8/10 |
| 2008/0135267 | A1 | * | 6/2008 | Karczewski | A01B 1/14 172/378 |

FOREIGN PATENT DOCUMENTS

WO     WO-9701267 A1 * 1/1997 ............... A01B 1/06

\* cited by examiner

*Primary Examiner* — Dean J Kramer
(74) *Attorney, Agent, or Firm* — Weiss & Moy, P.C.; Jeffrey D Moy

(57) ABSTRACT

A digging fork has a shaft at an end of which extends in a row first, second, third and fourth tines. The second and third tines are angled towards each other to form a wedge shape and the first and fourth tines are substantially parallel to each other.

4 Claims, 3 Drawing Sheets

DIGGING FORK

The present invention relates to a digging fork suitable for horticultural and in particular gardening purposes.

Digging is routinely required in gardens to prepare soil for planting. It can be of particular importance to break up hard clumps of soil as such hardened portions of soil are inhospitable for roots of plants.

Soil is typically dug and clumps broken using a digging implement such as a shovel, spade, fork or hoe.

The present invention seeks to improve upon the prior art.

According to the present invention there is provided a digging fork having a shaft at an end of which extends in a row first, second, third and fourth tines characterized in that: the second and third tines are angled towards each other to form a wedge shape; the first and fourth tines are substantially parallel to each other.

By providing a pair of adjacent tines that are angled to converge to form a wedge shape, and such that their distal ends are either directly adjacent to each other or the tines join together so as to form a single point a fork is operable to break clumps of soil owing to the pair of tines tapering outwardly from the distal point or distal ends towards the shaft of the fork.

In some embodiments the fork comprises at least one bar connecting a pair of adjacent tines, the bar being located between proximal and distal ends of the adjacent tines.

In some embodiments the fork comprises a first bar connecting the first and second tines.

In some embodiments the fork comprises a second bar connecting the third and fourth tines.

In some embodiments the at least one bar is located closer to the distal ends of the tines than to the proximal ends of the tines.

In some embodiments the at least one bar is located approximately two thirds of the length of the tines from the proximal ends thereof.

In some embodiments the second and third tines converge such that their distal ends are adjacent each other and are separated from each other by no more than 2 cm, or by no more than 1 cm, or by no more than 0.5 cm, or by no more than 0.25 cm.

In some embodiments the tines converge such that their distal ends abut each other.

In some embodiments the tines converge to join together and terminate at a single distal point.

In order that the present invention may be more fully understood a specific embodiment will now be described by way of example with reference to the accompanying drawings, of which:

Figure 1:
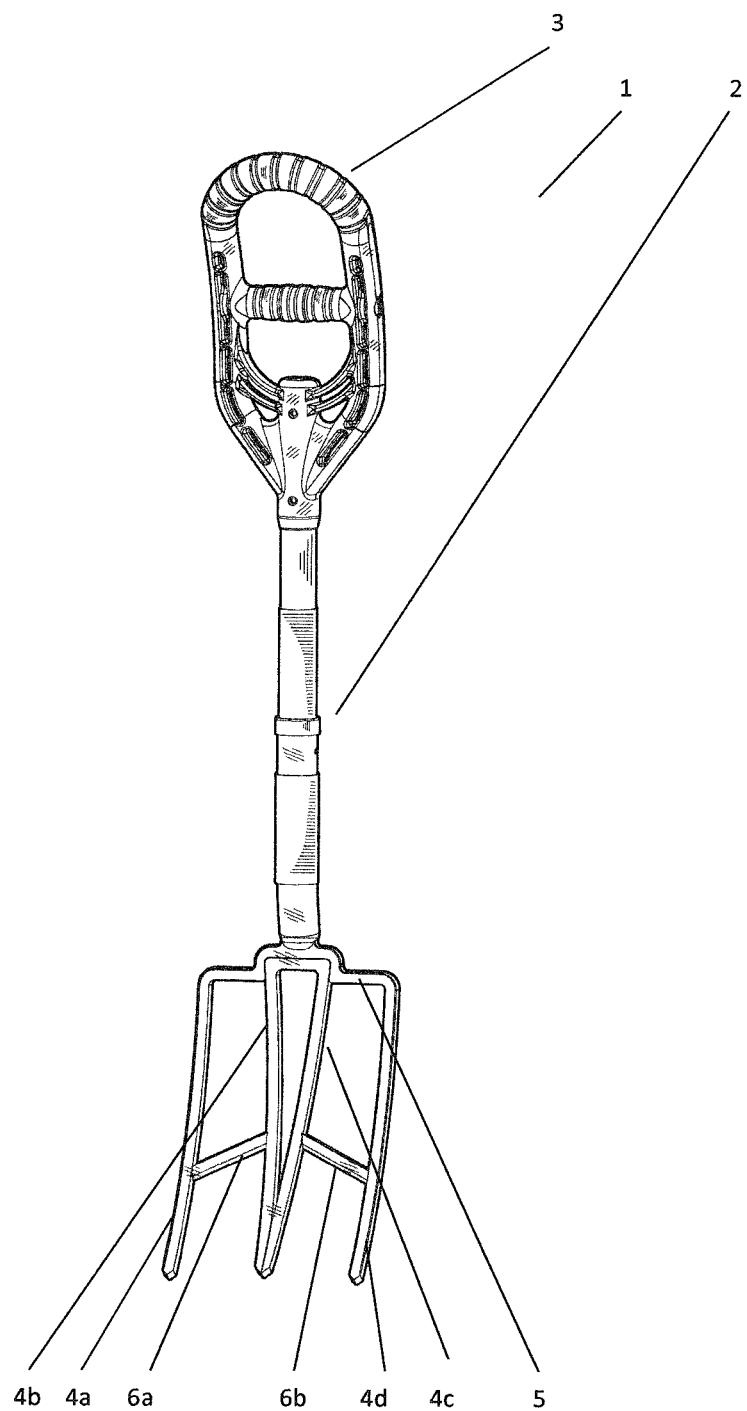
FIG. 1 is a perspective view of a fork made in accordance with the present invention.

Referring to the drawings, a digging fork 1 comprises a shaft 2 having at a first end a handle 3 and at a second end having precisely four tines 4a, 4b, 4c, 4d.

Tines 4a, 4b, 4c, 4d extend from a supporting bar 5 that is substantially orthogonal to shaft 2. The ends of tines 4a, 4b, 4c, 4d at supporting bar 5 may be considered to be the proximal ends of tines 4a, 4b, 4c, 4d whereas the opposing ends of the tines may be considered to be the distal ends of tines 4a, 4b, 4c, 4d.

First tine 4a, second tine 4b, third tine 4e and fourth tine 4d are arranged in a row.

Figure 2:
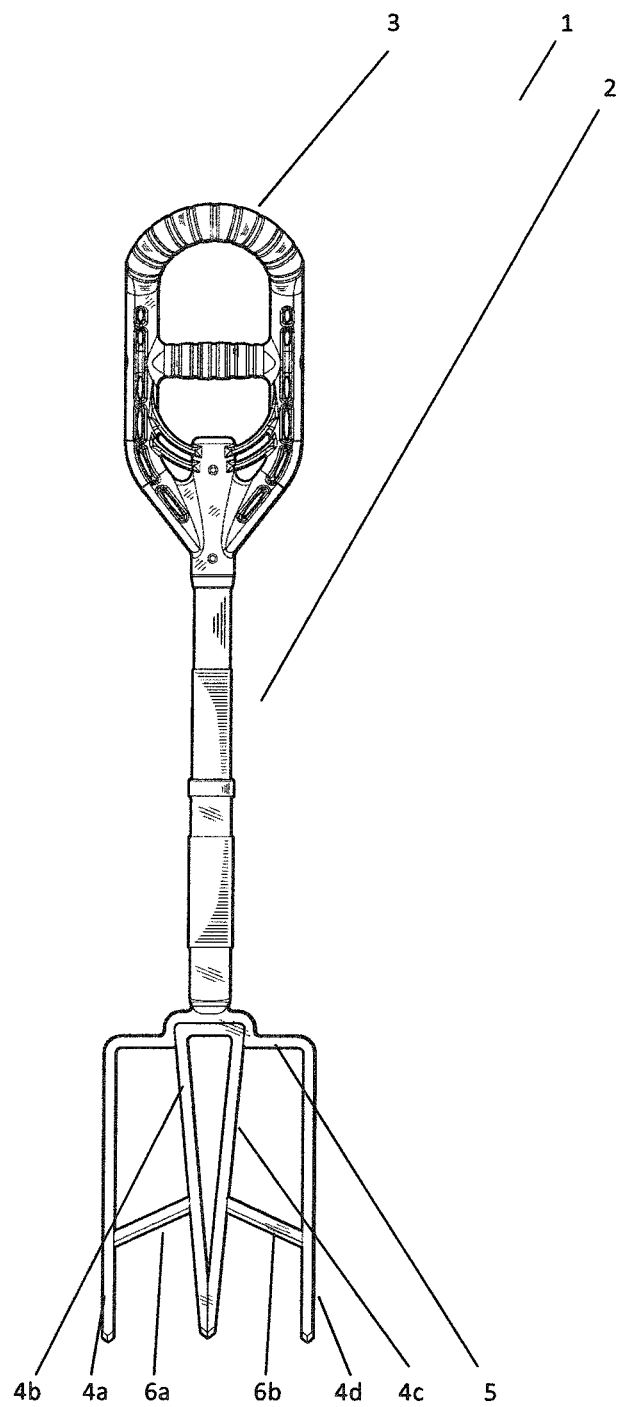
FIG. 2 is a front view of the fork of FIG. 1.

Viewed from the front of fork 1 (as illustrated in FIG. 2) first tine 4a and fourth tine 4d have longitudinal axes that are substantially parallel to each other.

Thus in the present instance as the width of tines 4a and 4d is substantially constant and the distance between them is substantially constant along the tines between proximal ends of first and fourth tines 4a, 4d and distal ends of first and fourth tines 4a, 4d.

In contrast, viewed from the front of fork 1 second tine 4b and third tine 4c have longitudinal axes that are convergent.

Viewed from the front of fork 1 each of tines 4a, 4b, 4c, 4d are substantially linear, with first and fourth tines 4a, 4d being substantially perpendicular to supporting bar 5 and second and third tines 4b, 4e being angled to supporting bar 5.

Figure 3:
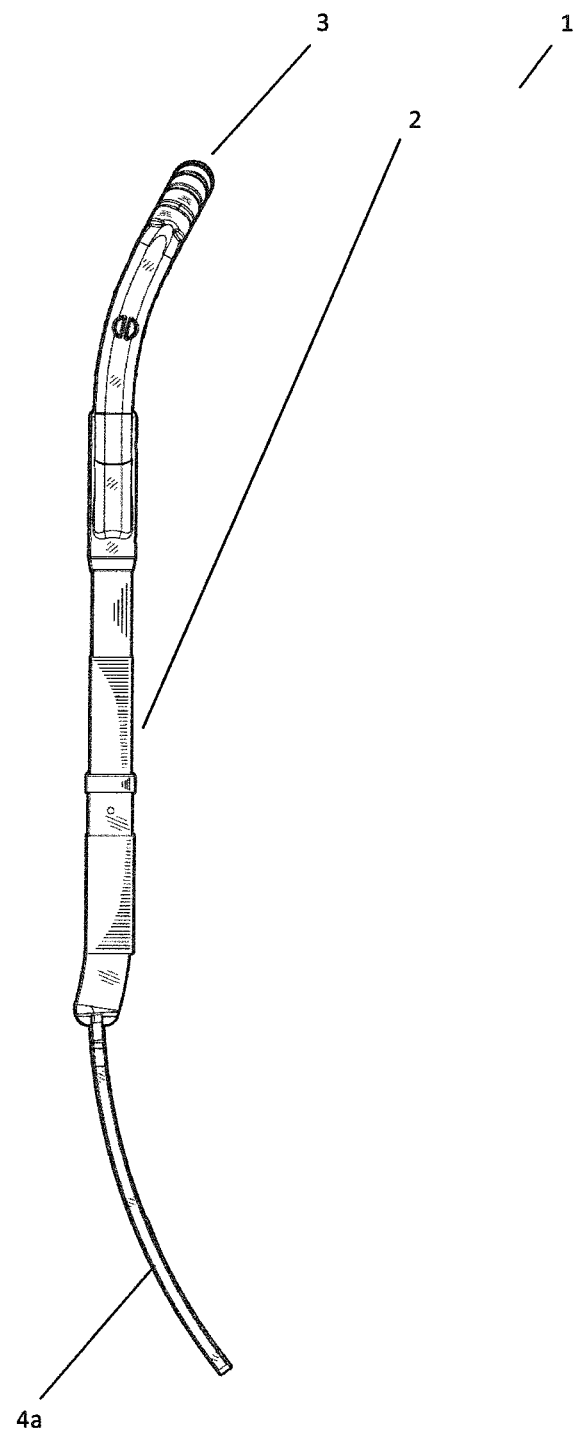
FIG. 3 is a side view of the fork of FIG. 1.

Tines 4a, 4b, 4c, 4d are all curved in profile, as illustrated in FIG. 3. However, in other embodiments tines may be substantially linear.

In some embodiments tines 4a, 4b, 4c, 4d may be tapered from a first width at their proximal ends adjacent supporting bar 5 to a second narrower distal end.

Tines 4a and 4b are connected by a first bar 6a that is located approximately two thirds of the distance from proximal ends of tines 4a, 4b to distal ends of tines 4a, 4b.

Similarly tines 4c and 4d are connected by a second bar 6b that is located approximately two thirds of the distance from proximal ends of tines 4c, 4d to distal ends of tines 4e, 4d.

Bar 6a is angled to tines 4a and 4b such that distal portion of tine 4a and bar 6a display an obtuse angle and distal portion of tine 4b and bar 6a display an acute angle.

Similarly bar 6b is angled to tines 4d and 4c such that distal portion of tine 4d and bar 6b display an obtuse angle and distal portion of tine 4c and bar 6d display an acute angle.

However, in other embodiments bars 6a, 6b may be angled differently or may be substantially parallel to supporting bar 5.

In the present embodiment the distal ends of tines 4b, 4c abut each other such that they together form a V-shape that is substantially centrally disposed between tines 4a, 4d.

Whilst not preferred, in other embodiments a small gap may exist between convergent tines. In further embodiments convergent tines may be attached together or formed in one piece.

Thus, tines 4b and 4c together form a V-shaped wedge that is operable when fork 1 is in use to break up clumps of soil instead of such clumps being merely impaled and hindering operation of the fork.

Furthermore bars 6a, 6b are operable to also cleave lumps of soil that are found between pair of tines 4a and 4b and between pair of tines 4c and 4d. Alongside acting to cleave lumps of soil bars 6a, 6b provide strength to the arrangement of tine 4a, 4b, 4c, 4d.

Any lumps of soil that are impaled upon tines 4a, 4b, 4c or 4d may be broken by further digging owing to bars 6a, 6b acting to break such clumps.

Thus a user is able to dig in claggy soil more easily than with conventional forks.

The present application describes a fork in an unused state, fresh from manufacture, and without deformation of its tines through use of the fork.

Many variations are possible without departing from the scope of the present invention as defined in the appended claims.

The invention claimed is:

1. A digging fork having a shaft at an end of which extends in a row first, second, third and fourth tines characterized in that:
   the second and third tines are angled towards each other to form a wedge shape;
   the first and fourth tines are substantially parallel to each other;
   a first angled bar connecting the first and second tines;
   a second angled bar connecting the third and fourth tines; and
   wherein the second and third tines converge to join together and terminate at a single distal point.

2. The fork of claim 1 wherein the first angled bar is angled upward from the first tine to the second tine.

3. The fork of claim 1 wherein the second angled bar is angled upward from the fourth tine to the third tine.

4. The fork of claim 1 wherein the first, second, third and fourth tines extend down and away from the shaft and are all planar to one another.

* * * * *